May 29, 1934.  C. A. ALBRECHT  1,960,656
DISTRIBUTOR BARS FOR TYPOGRAPHICAL COMPOSING AND DISTRIBUTING MACHINES
Filed Nov. 22, 1932
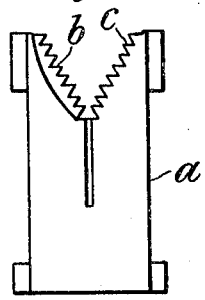
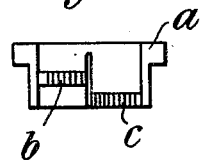
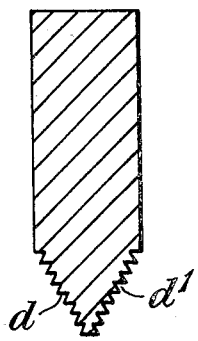
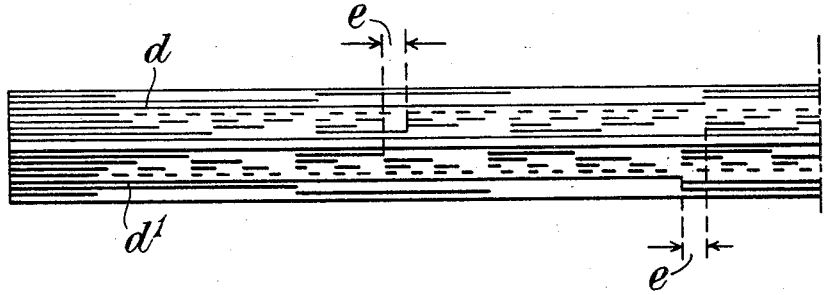
Inventor.
C. A. Albrecht
By Morrison Kennedy Campbell
Attorneys Patented May 29, 1934

1,960,656

UNITED STATES PATENT OFFICE 1,960,656

DISTRIBUTOR BAR FOR TYPOGRAPHICAL COMPOSING AND DISTRIBUTING MACHINES

Christian Augustus Albrecht, Berlin, Germany, assignor to Mergenthaler Linotype Company, Brooklyn, N. Y., a corporation of New York Application November 22, 1932, Serial No. 643,806
In Germany August 9, 1932

1 Claim. (Cl. 199—64)

This invention relates to distributing mechanism for typographical composing and distributing machines such as those known commercially under the trade mark "Linotype", wherein circulating matrices, are released from a magazine and assembled in line, a slug or type bar cast from the assembled line of matrices and the matrices thereafter returned through a distributing mechanism to the magazine in which they are stored, such distribution being effected by the release of the matrices from a V-shaped distributor bar having combinations of teeth rails engaged by teeth formed in V-shaped notches on the matrices.

It has already been proposed to arrange the distributing teeth on the matrices so that the teeth on opposite sides of the V-shaped notch will be relatively staggered or offset. These matrices have the disadvantage that their two sides are released at different times when they fall from the distributor bar. Consequently, the matrices tend to rock or tilt as they fall from the bar and this may prevent them from properly passing into the respective channels of the magazine entrance.

The object of the present invention is to overcome this difficulty. For this purpose the distributor bar is constructed with the different combinations of teeth located on opposite sides of the V-shaped edge, staggered or offset to correspond with the staggering of the teeth on the respective matrices, so that the teeth of these matrices shall all be released simultaneously.

The accompanying drawing illustrates by way of example one constructional form of the invention. In the said drawing:—

Figure 1 is a side elevation of a matrix with relatively staggered teeth as heretofore proposed, whilst Figure 2 is a plan thereof;

Figure 3 is a cross-section through the distributor bar, and

Figure 4 shows a portion of the distributor bar as viewed from below, with a diagrammatic representation of the distributing teeth.

The matrix $a$ is constructed in the manner heretofore proposed; it is provided at its top end with a V-shaped notch on either side of which are located the distributing teeth $b$ and $c$. As is apparent from the plan in Figure 2, these combinations of teeth $b$ and $c$ are offset one relatively to the other. When a matrix of this construction is pushed upon the distributor bar, the teeth $c$ will reach the bar first, and when the matrix is released they will also be released first, if the bar be constructed in the manner heretofore proposed. According to the invention, as shown in Figures 3 and 4, the corresponding combinations of teeth on the two sides of the distributor bar (i. e. the teeth appropriate to any one matrix) are relatively staggered. Thus, the toothed sections $d$ and $d^1$ arranged in the same manner on the two sides of the distributor bar, are relatively staggered in the longitudinal direction to the extent shown at $e$, so that the rear surfaces of the two toothed sections $b$, $c$ of any given matrix will reach the end of the corresponding combination of bar teeth $d$, $d'$ simultaneously and therefore be simultaneously released from the distributor bar, with the result that the matrix will be enabled to properly fall into the respective magazine entrance channel.

When the whole set of matrices is provided with relatively staggered teeth, all the combinations of teeth on the distributor bar will be correspondingly staggered, but it is of course possible for only a portion of the matrix set to be constructed in this manner, in which case the distributor bar need have only a corresponding number of its tooth combinations staggered. Individual combinations of teeth may then be somewhat longer upon one side than upon the other, but this need not affect the regular functioning of the distributor bar.

Having described my invention, I declare that what I claim and desire to secure by Letters Patent is:—

In or for a typographical composing and distributing machine adapted to be equipped with matrices having like distributing teeth located on opposite sides of their V-shaped notches in relatively staggered relationship, a distributor bar having like tooth combinations relatively staggered on its two sides to correspond with the staggered teeth of the respective matrices.

CHRISTIAN AUGUSTUS ALBRECHT.